US012676499B2

(12) United States Patent
Guo et al.

(10) Patent No.: US 12,676,499 B2
(45) Date of Patent: Jul. 7, 2026

(54) DC BACKUP POWER SYSTEM

(71) Applicant: Ace Power and Technology Co.,Ltd, Shanghai (CN)

(72) Inventors: Xingkuan Guo, Shanghai City (CN); Yuetian Wang, Shanghai City (CN)

(73) Assignee: Ace Power and Technology Co., Ltd, Shanghai (CN)

( * ) Notice: Subject to any disclaimer, the term of this patent is extended or adjusted under 35 U.S.C. 154(b) by 89 days.

(21) Appl. No.: 18/949,687

(22) Filed: Nov. 15, 2024

(65) Prior Publication Data

US 2025/0167585 A1    May 22, 2025

(30) Foreign Application Priority Data

Nov. 16, 2023    (CN) .......................... 202311536290.7

(51) Int. Cl.
*H02J 9/06*        (2006.01)
*H02J 7/00*        (2026.01)
(Continued)

(52) U.S. Cl.
CPC ................ *H02J 9/061* (2013.01); *H02J 7/02* (2013.01); *H02J 7/62* (2026.01); *H02J 7/855* (2026.01);
(Continued)

(58) Field of Classification Search
CPC .... H02J 9/061; H02J 7/02; H02J 7/855; H02J 2207/20; H02J 9/068; H02M 7/00; H02M 1/4225
See application file for complete search history.

(56) References Cited

U.S. PATENT DOCUMENTS 5,465,011 A * 11/1995 Miller ..................... H02J 9/062
                                                                    307/64
5,856,712 A *  1/1999 Suzuki ................... H02M 7/21
                                                                    307/64
(Continued)

FOREIGN PATENT DOCUMENTS

CN        219164234 U      6/2023

OTHER PUBLICATIONS

YD T 3089-2016, "336V Direct current power supply system for telecommunication," Apr. 5, 2016-Jul. 1, 2016, 30 pages. [English machine translation provided].
(Continued)

*Primary Examiner* — Rexford N Barnie
*Assistant Examiner* — Terrance R Willoughby
(74) *Attorney, Agent, or Firm* — Hanley, Flight & Zimmerman, LLC

(57)        ABSTRACT
A Direct Current (DC) backup power system is provided in the present disclosure, comprising a three-port module and an energy storage battery, wherein the three-port module comprises a rectifier unit and a charging and discharging unit, wherein the rectifier unit is connected to the charging and discharging unit, the charging and discharging unit is connected to the energy storage battery, and an output end of the rectifier unit is connected to a load; the rectifier unit comprises a DCDC converter; a first end of the energy storage battery is connected to a first output end of the DCDC converter, and a second end of the energy storage battery is connected to a second output end of the DCDC converter through the charging and discharging unit. The DC backup power system according to the embodiments of the present disclosure improve the service life of the energy storage battery.

18 Claims, 6 Drawing Sheets

(51) Int. Cl.

| | | |
|---|---|---|
| *H02J 7/02* | (2016.01) |
| *H02J 7/62* | (2026.01) |
| *H02M 1/42* | (2007.01) |
| *H02M 3/24* | (2006.01) |

(52) U.S. Cl.
CPC ........... *H02J 7/865* (2026.01); *H02M 1/4208* (2013.01); *H02M 3/24* (2013.01); *H02J 2207/20* (2020.01)

(56) References Cited

U.S. PATENT DOCUMENTS

| | | | | |
|---|---|---|---|---|
| 6,157,168 A * | 12/2000 | Malik | ...................... | H02J 9/061 |
| | | | | 307/66 |
| 6,255,744 B1 * | 7/2001 | Shih | ........................ | H02J 9/061 |
| | | | | 307/64 |
| 7,053,502 B2 * | 5/2006 | Aihara | .................... | H02J 9/061 |
| | | | | 307/66 |
| 2003/0222618 A1 * | 12/2003 | Kanouda | ................. | H02J 9/062 |
| | | | | 320/116 |
| 2004/0125626 A1 * | 7/2004 | Kanouda | ............. | H02M 1/4225 |
| | | | | 363/125 |
| 2022/0158481 A1 * | 5/2022 | Sasahara | ................. | H02J 9/061 |
| 2023/0246478 A1 * | 8/2023 | Tamaki | .................... | H02J 7/34 |
| | | | | 307/64 |
| 2026/0048711 A1 * | 2/2026 | Kawai | .................. | B60R 16/033 |

OTHER PUBLICATIONS

YD_T 2378-2020, "240V direct current power supply system for telecommunications," Apr. 16, 2020-Jul. 1, 2020, 47 pages. [English machine translation provided].

* cited by examiner

DC BACKUP POWER SYSTEM

CROSS-REFERENCE TO RELATED APPLICATIONS

This application claims priority to Chinese Application Number 202311536290.7, filed on Nov. 16, 2023, the subject matter of which is incorporated herein by reference.

TECHNICAL FIELD

The present disclosure relates to the technical field of power supply equipment, and particularly to a Direct Current (DC) backup power system.

BACKGROUND ART

At present, a data center is externally connected to a power supply and equipped with an energy storage battery as a backup power supply. When the mains supply is unavailable, the energy storage battery is started to supply power, so as to ensure the uninterrupted power supply to the data center.

In the prior art, a DC data center power supply system connects the energy storage battery in parallel at an output side as a backup power supply, as illustrated in FIG. 1. Because a load is also connected in parallel at the output side, in a case where the load is electrified by the mains supply, the energy storage battery may discharge to the load and the DC power supply system may charge the energy storage battery when the load changes, so that the number of times of charging and discharging of the energy storage battery is increased, and the service life of the energy storage battery is reduced.

SUMMARY OF THE DISCLOSURE

Aiming at the problems in the prior art, the embodiments of the present disclosure provides a DC backup power system, which can at least partially solve the problems in the prior art.

The present disclosure proposes a Direct Current (DC) backup power system, comprising a three-port module and an energy storage battery, wherein the three-port module comprises a rectifier unit and a charging and discharging unit, wherein the rectifier unit is connected to the charging and discharging unit, the charging and discharging unit is connected to the energy storage battery, and an output end of the rectifier unit is connected to a load; the rectifier unit is configured to convert external alternating current into direct current to supply power to the load, charge the energy storage battery through the charging and discharging unit, and output the electric energy of the energy storage battery to supply power to the load after the external alternating current is disconnected; the rectifier unit comprises a filter, a power factor correction circuit and a DCDC converter which are connected in sequence; a first end of the energy storage battery is connected to a first output end of the DCDC converter, and a second end of the energy storage battery is connected to a second output end of the DCDC converter through the charging and discharging unit.

Further, the DCDC converter comprises a primary circuit, an isolation transformer and a secondary rectifier circuit; an input end of the isolation transformer is connected to the primary circuit, and an output end of the isolation transformer is connected to the secondary rectifier circuit; and the isolation transformer is configured to isolate the primary circuit and the secondary rectifier circuit, and the secondary rectifier circuit is configured to convert alternating current transferred by the isolation transformer into direct current.

Further, a first fault isolation unit is provided between the second end of the energy storage battery and the charging and discharging unit.

Further, the first fault isolation unit adopts a fuse.

Further, a filter unit and/or an overcurrent protection unit is provided between the second end of the energy storage battery and the charging and discharging unit.

Further, the second output end of the DCDC converter is provided with a second fault isolation unit.

Further, the second fault isolation unit adopts a fuse or a diode.

Further, an energy storage filter unit is connected in parallel at an output end of the power factor correction circuit, and the energy storage filter unit comprises at least one capacitor.

Further, the DC backup power system comprises a plurality of three-port modules which are connected in parallel.

Further, the DC backup power system according to the embodiments of the present disclosure further comprises a diode, an anode of which is connected to a positive electrode of the energy storage battery, and a cathode of which is connected to an input end of the load.

The DC backup power system according to the embodiments of the present disclosure comprises a three-port module and an energy storage battery, wherein the three-port module comprises a rectifier unit and a charging and discharging unit, wherein the rectifier unit is connected to the charging and discharging unit, the charging and discharging unit is connected to the energy storage battery, and an output end of the rectifier unit is connected to a load; the rectifier unit is configured to convert external alternating current into direct current to supply power to the load, charge the energy storage battery through the charging and discharging unit, and output the electric energy of the energy storage battery to supply power to the load after the external alternating current is disconnected; the rectifier unit comprises a filter, a power factor correction circuit and a DCDC converter which are connected in sequence, wherein a first end of the energy storage battery is connected to a first output end of the DCDC converter, and a second end of the energy storage battery is connected to a second output end of the DCDC converter through the charging and discharging unit. Since the energy storage battery is not directly connected to the load, the influence of load change on charging and discharging of the energy storage is avoided, the number of times of charging and discharging of the energy storage battery is reduced, and the service life of the energy storage battery is improved.

BRIEF DESCRIPTION OF THE DRAWINGS

In order to explain the technical solutions in the embodiments of the present disclosure or in the prior art more clearly, the drawings to be used the description of the embodiments or the prior art will be briefly introduced below. Obviously, the drawings involved in the following description only illustrate some embodiments of the present disclosure, and those of ordinary skill in the art can obtain other drawings from them without paying any creative effort. In the drawings.

DETAILED DESCRIPTION OF THE PREFERRED EMBODIMENTS

In order that the objectives, technical solutions and advantages of the embodiments of the present disclosure are clearer, the embodiments of the present disclosure will be further described in detail with reference to the drawings. Here, the exemplary embodiments of the present disclosure and the descriptions thereof are used as explanations of, rather than limitations to, the present disclosure. It should be noted that the embodiments in the present disclosure and the features in the embodiments can be arbitrarily combined with each other without conflict.

In order to facilitate the understanding of the technical solutions in the present disclosure, the related contents thereof will be firstly explained below.

In order to solve the problem that the number of times of charging and discharging of an energy storage battery is increased and the service life of the energy storage battery is affected since the energy storage battery is directly connected in parallel at an output side of a DC power supply system, the embodiments of the present disclosure provide a DC backup power system, in which the energy storage battery is not connected in parallel to the output side, but is built into a rectifier power supply link. Because the energy storage battery is connected to the rectifier power supply link and is not directly connected to a load, the charging and discharging of the energy storage battery is related to a rectifier unit rather than the load, and the charging and discharging of the energy storage battery can be accurately controlled. Thus, the energy storage battery can only be discharged when an external power supply is disconnected, and the number of times of charging and discharging of the energy storage battery can be reduced, thereby improving the service life of the energy storage battery.

In addition, since the energy storage battery is no longer connected in parallel at the output side of the DC power supply system, the range of an output voltage may be very small. For the DC power supply system of 240 V, the output voltage may be fixed at 270 Vdc, and for the DC power supply system of 336 V, the output voltage may be fixed at 400 Vdc. The distribution switches, cables and server power supplies, etc. of the downstream electrical equipment only need to meet the voltage range. For the same system power, the voltage at the output side can be increased, so that the current at the output side can be decreased, the switching capacity can be reduced, and the cables can be thinned, that is, the cost and loss of the downstream DC distribution system will be lowered.

Figure 1:
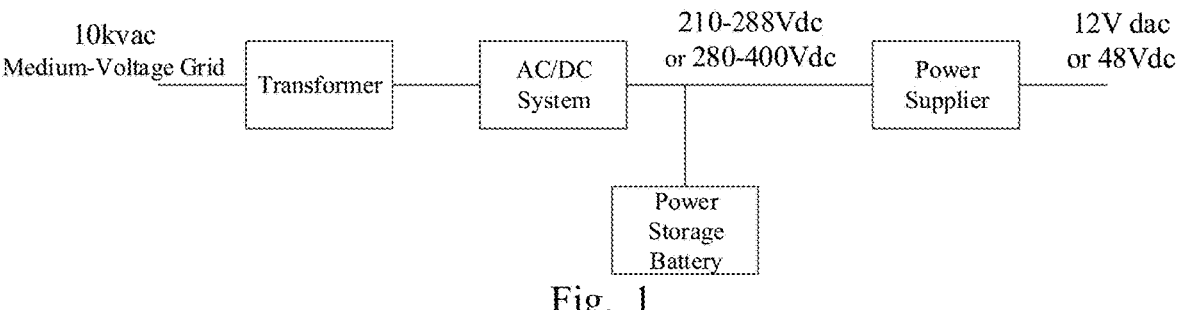
FIG. 1 illustrates a structural diagram of a power supply system in a data center in the prior art.
Figure 2:
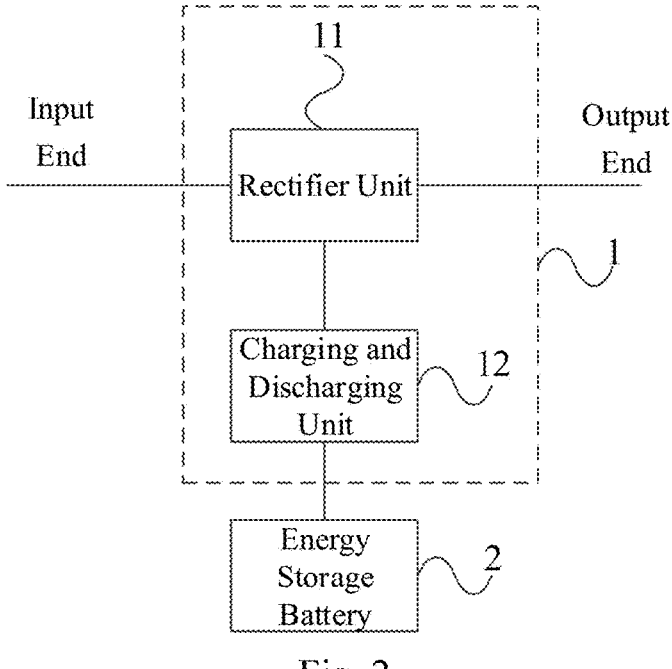
FIG. 2 illustrates a structural diagram of a DC backup power system according to a first embodiment of the present disclosure.

FIG. 2 illustrates a structural diagram of a DC backup power system according to a first embodiment of the present disclosure. As illustrated in FIG. 2, the DC backup power system according to the embodiment of the present disclosure includes a three-port module 1 and an energy storage battery 2, wherein:

the three-port module 1 includes a rectifier unit 11 and a charging and discharging unit 12, wherein the rectifier unit 11 is connected to the charging and discharging unit 12, the charging and discharging unit 12 is connected to the energy storage battery 2, and an output end of the rectifier unit 11 is connected to a load;

the rectifier unit 11 is configured to convert external alternating current into direct current to supply power to the load, charge the energy storage battery 23 through the charging and discharging unit 12, and output the electric energy of the energy storage battery 2 to supply power to the load after the external alternating current is disconnected.

Specifically, the input end of the rectifier unit 11 is externally connected to the alternating current, and an output end of the rectifier unit 11 is connected to the load. The rectifier unit 11 is connected to the charging and discharging unit 12, the charging and discharging unit 12 is connected to the energy storage battery 2, and the energy storage battery 2 is not connected in parallel at the output side of the rectifier unit 11.

When the alternating current is externally connected, the rectifier unit 11 converts the input alternating current into direct current and supplies the converted direct current to the load. Meanwhile, the rectifier unit 11 supplies the converted direct current to the energy storage battery 2 through the charging and discharging unit 12 to charge the energy storage battery 2. When the external alternating current is disconnected, the energy storage battery 2 discharges, and the electric energy output from the energy storage battery 2 is supplied to the load through the charging and discharging unit 12 and the rectifier unit 11 to ensure the uninterrupted power supply to the load. The charging and discharging unit 12 is configured to charge and discharge the energy storage battery 2.

Figures 3, 4:
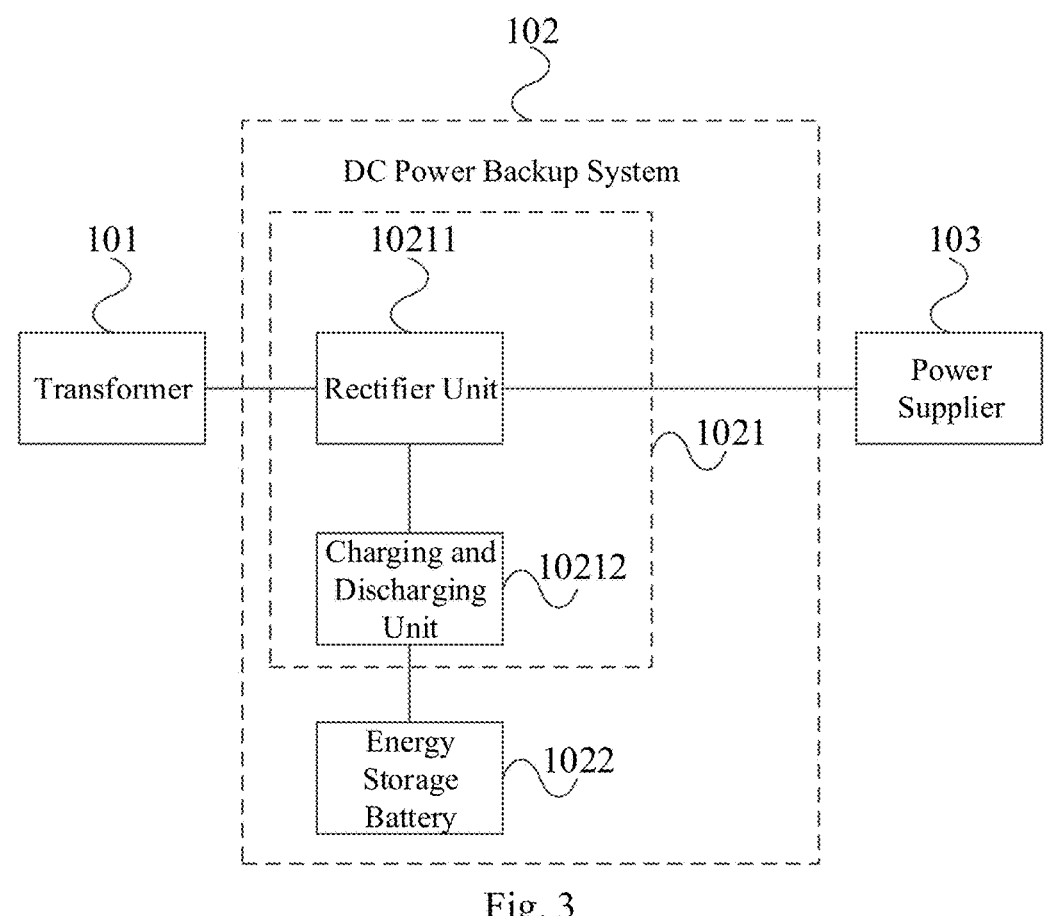
FIG. 3 illustrates a structural diagram of a data center power supply system according to a second embodiment of the present disclosure.
FIG. 4 illustrates a structural diagram of a DC backup power system according to a third embodiment of the present disclosure.

For example, as illustrated in FIG. 3, a data center power supply system includes a transformer 101, a DC backup power system 102 and a power supplier 103. The DC backup power system includes a three-port module 1021 and an energy storage battery 1022, and the three-port module 1021 includes a rectifier unit 10211 and a charging and discharging unit 10212. An input end of the transformer 101 is externally connected to a power grid, an output end of the transformer 101 is connected to the input end of the rectifier unit 10211, the rectifier unit 10211 is connected to the charging and discharging unit 10212, and the charging and discharging unit 10212 is connected to the energy storage battery 1022. The transformer 101 is configured to convert a high voltage into a preset voltage and supply the preset voltage to the DC backup power system 102. An output end of the DC backup power system 102 is connected to the input end of the power supplier 103. The energy storage battery 2 is not connected in parallel at the output side of the DC backup power system 102. In which, the preset voltage is set according to actual needs, which is not limited in the embodiments of the present disclosure.

When the external power grid is connected, the rectifier unit 10211 converts the input alternating current into direct current and supplies the converted direct current to the power supplier 103. Meanwhile, the rectifier unit 10211 supplies the converted direct current to the energy storage battery 1022 through the charging and discharging unit 10212 to charge the energy storage battery 1022. When the external power grid is disconnected, the energy storage battery 1022 discharges, and the electric energy output from the energy storage battery 2 is supplied to the power supplier 103 through the charging and discharging unit 10212 and the rectifier unit 10211 to ensure the uninterrupted power supply to the power supplier 103.

FIG. 4 illustrates a structural diagram of a DC backup power system according to a third embodiment of the present disclosure. As illustrated in FIG. 4, the rectifier unit 11 includes a filter 111, a power factor correction circuit 112 and a DCDC converter 113 which are connected in sequence, wherein a first end of the energy storage battery 2 is connected to a first output end of the DCDC converter 113, and a second end of the energy storage battery 2 is connected to a second output end of the DCDC converter 113 through the charging and discharging unit 12.

Specifically, an input end of the filter 111 is connected to three-phase alternating current to filter electromagnetic interference in the alternating current. The power factor correction circuit 112 enables the input current to track the input voltage and to be close to a positive sine wave. DCDC converter 113 is configured to convert the alternating current into direct current. The direct current output from the DCDC converter 113 charges the energy storage battery 2 through the charging and discharging unit 12. The direct current output from the DCDC converter 113 is output to the load.

For example, as illustrated in FIG. 4, the first output end of the DCDC converter 113 is a positive output end A+ and the second output end of the DCDC converter 113 is a negative output end A−, so a positive electrode B+ of the energy storage battery 2 is connected to the charging and discharging unit 12, a negative electrode B− of the energy storage battery 2 is connected to the second output end of the DCDC converter 113, and the charging and discharging unit 12 is connected to the first output end and the second output end of the DCDC converter 113 respectively.

The DC backup power system according to the embodiment of the present disclosure includes a three-port module and an energy storage battery, wherein the three-port module includes a rectifier unit and a charging and discharging unit, wherein the rectifier unit is connected to the charging and discharging unit, the charging and discharging unit is connected to the energy storage battery, and an output end of the rectifier unit is connected to a load; the rectifier unit is configured to convert external alternating current into direct current to supply power to the load, charge the energy storage battery through the charging and discharging unit, and output the electric energy of the energy storage battery to supply power to the load after the external alternating current is disconnected; the rectifier unit includes a filter, a power factor correction circuit and a DCDC converter which are connected in sequence, wherein a first end of the energy storage battery is connected to a first output end of the DCDC converter, and a second end of the energy storage battery is connected to a second output end of the DCDC converter through the charging and discharging unit. Since the energy storage battery is not directly connected to the load, the influence of load change on charging and discharging of the energy storage is avoided, the number of times of charging and discharging of the energy storage battery is reduced, and the service life of the energy storage battery is improved.

Figure 5:
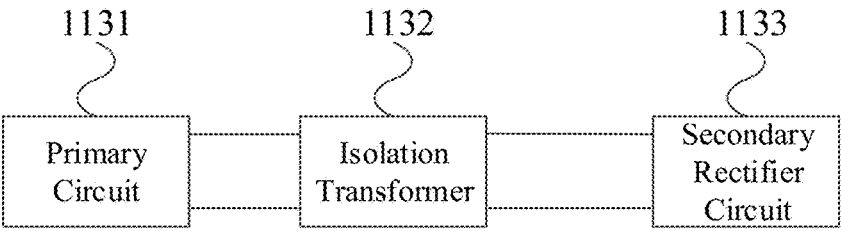
FIG. 5 illustrates a structural diagram of a DCDC converter according to a fourth embodiment of the present disclosure.

FIG. 5 illustrates a structural diagram of a DCDC converter according to a fourth embodiment of the present disclosure. As illustrated in FIG. 5, based on the above embodiments, the DCDC converter 113 further includes a primary circuit 1131, an isolation transformer 1132 and a secondary rectifier circuit 1133, wherein an input end of the isolation transformer 1132 is connected to the primary circuit 1131 and an output end of the isolation transformer 1132 is connected to the secondary rectifier circuit 1133, and an input end of the primary circuit 1131 is connected to an output end of the power factor correction circuit 112 and an output end of the secondary rectifier circuit 1133 is connected to an input end of the load. The isolation transformer 1132 is configured to isolate the primary circuit 1131 and the secondary rectifier circuit 1133, and the secondary rectifier circuit 1133 is configured to convert alternating current transferred by the isolation transformer 1132 into direct current. The primary circuit 1131 serves as a primary side of a DC conversion line and converts direct current into high-frequency alternating current. The primary circuit 1131 is selected according to actual needs, which is not limited in the embodiments of the present disclosure.

Figure 6:
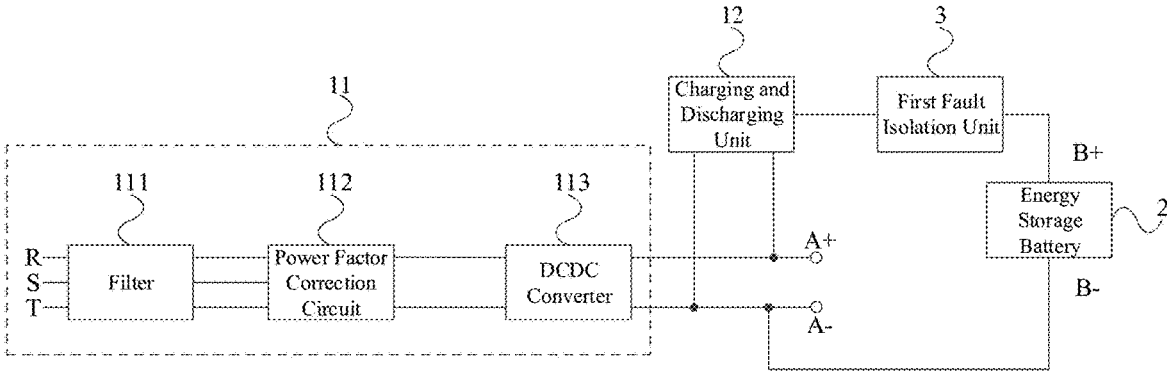
FIG. 6 illustrates a structural diagram of a DC backup power system according to a fifth embodiment of the present disclosure.

FIG. 6 illustrates a structural diagram of a DC backup power system according to a fifth embodiment of the present disclosure. As illustrated in FIG. 6, based on the above embodiments, a first fault isolation unit 3 is further provided between the second end of the energy storage battery 2 and the charging and discharging unit 12. The first fault isolation unit 3 achieves an effect of fault isolation.

Based on the above embodiments, further, the first fault isolation unit 3 adopts a fuse.

Figure 7:
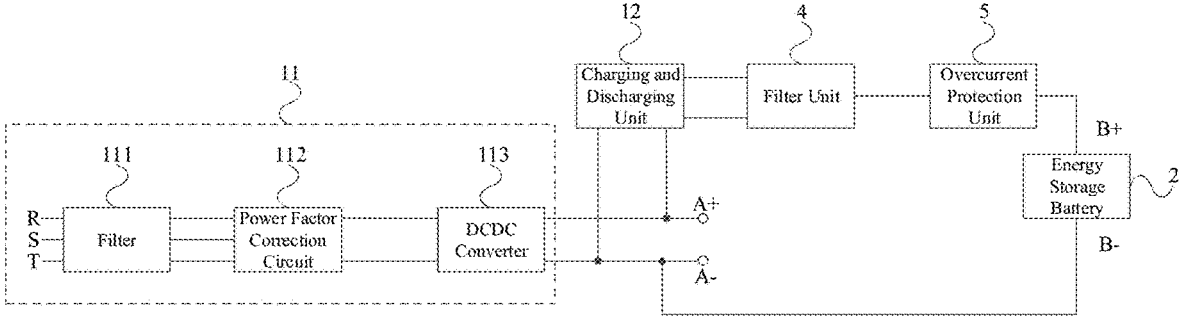
FIG. 7 illustrates a structural diagram of a DC backup power system according to a sixth embodiment of the present disclosure.

FIG. 7 illustrates a structural diagram of a DC backup power system according to a sixth embodiment of the present disclosure. As illustrated in FIG. 7, based on the above embodiments, a filter unit 4 and/or an overcurrent protection unit 5 is further provided between the second end of the energy storage battery 2 and the charging and discharging unit 12.

Specifically, the filter unit 4 is configured to filter electromagnetic interference. The overcurrent protection unit 5 is configured to suppress short-circuit current or overload current in a circuit. The overcurrent protection unit 5 may adopt a fuse or a protection switch, which is selected according to actual needs, and not limited in the embodiments of the present disclosure.

Figure 8:
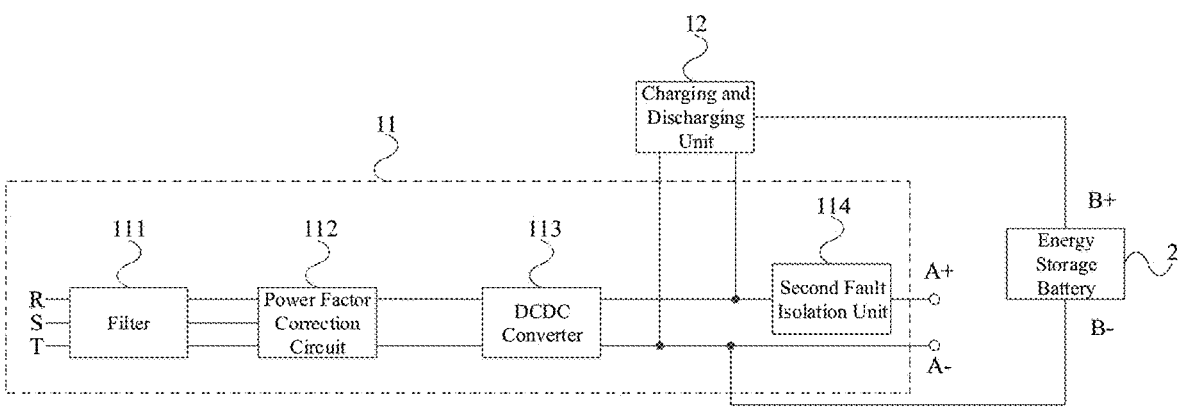
FIG. 8 illustrates a structural diagram of a DC backup power system according to a seventh embodiment of the present disclosure.

FIG. 8 illustrates a structural diagram of a DC backup power system according to a seventh embodiment of the present disclosure. As illustrated in FIG. 8, based on the above embodiments, a second fault isolation unit 114 is further provided at the second output end of the DCDC converter 113. The second fault isolation unit 114 is configured to prevent current at an output end from flowing back to the DCDC converter 113 and achieves an effect of fault isolation.

Based on the above embodiments, further, the second fault isolation unit 114 adopts a fuse or a diode.

Figure 9:
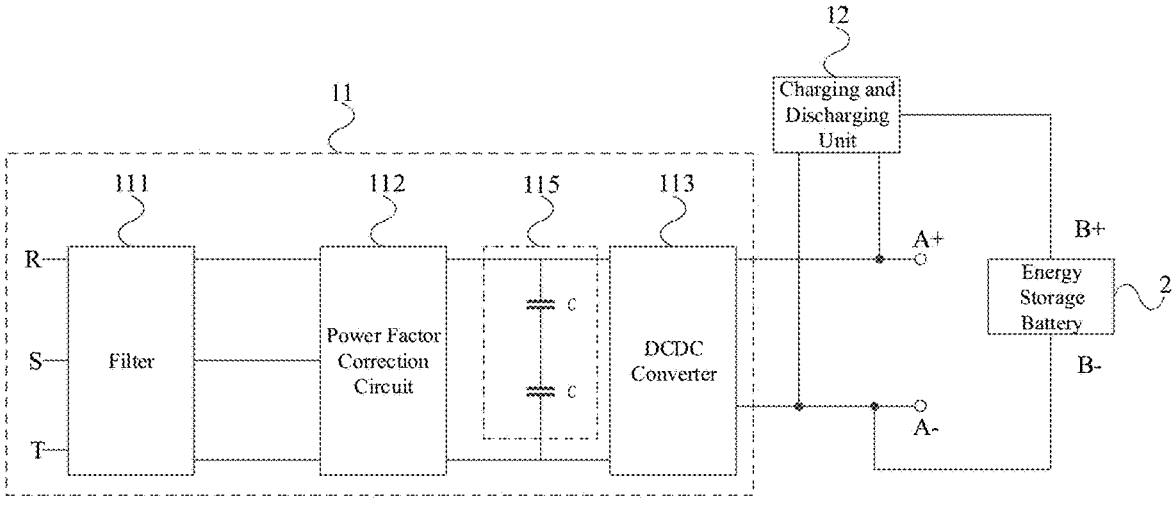
FIG. 9 illustrates a structural diagram of a DC backup power system according to an eighth embodiment of the present disclosure.

FIG. 9 illustrates a structural diagram of a DC backup power system according to an eighth embodiment of the present disclosure. As illustrated in FIG. 9, an energy storage filter unit 115 is connected in parallel at the output end of the power factor correction circuit 112, and the energy storage filter unit 115 includes at least one capacitor C for energy storage and filtering. When the energy storage filter unit 115 includes a plurality of capacitors, the plurality of capacitors are sequentially connected in series.

Figure 10:
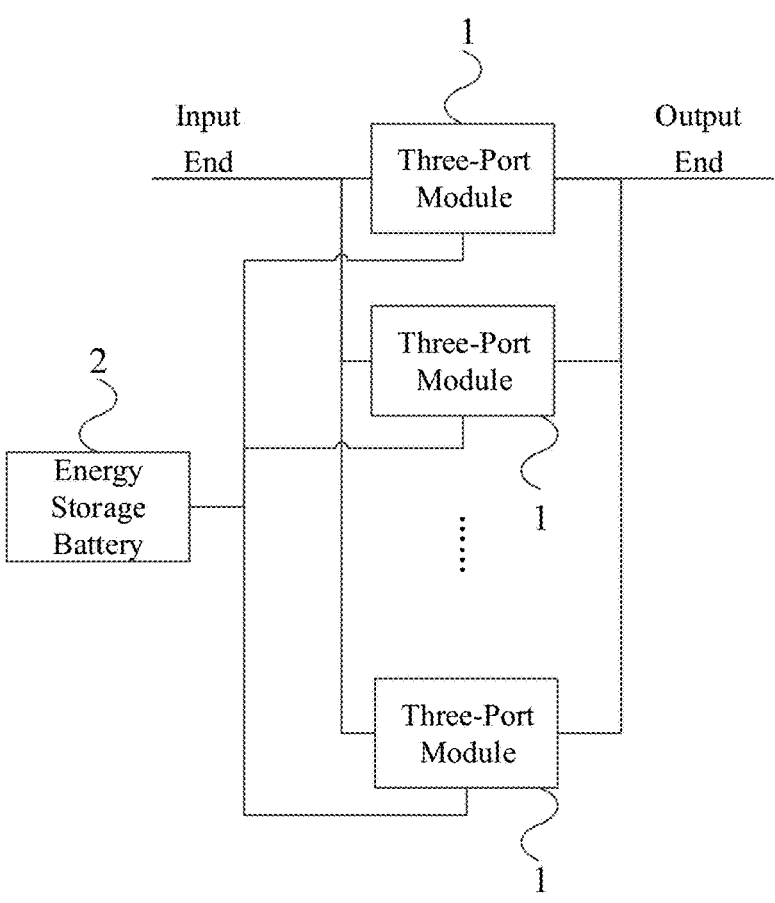
FIG. 10 illustrates a structural diagram of a DC backup power system according to a ninth embodiment of the present disclosure.

FIG. 10 illustrates a structural diagram of a DC backup power system according to a ninth embodiment of the present disclosure. As illustrated in FIG. 10, based on the above embodiments, the DC backup power system further includes a plurality of three-port modules 1, which are connected in parallel. The energy storage battery 2 may be connected to one or more of the three-port modules 1, which is set according to actual needs and is not limited in the embodiments of the present disclosure.

Figure 11:
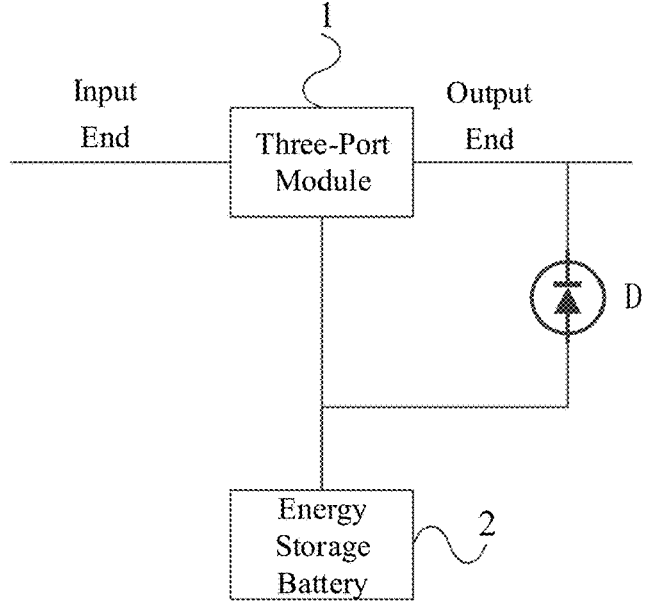
FIG. 11 illustrates a structural diagram of a DC backup power system according to a tenth embodiment of the present disclosure.

FIG. 11 illustrates a structural diagram of a DC backup power system according to a tenth embodiment of the present disclosure. As illustrated in FIG. 11, based on the above embodiments, the DC backup power system according to the embodiment of the present disclosure further includes a diode D, an anode of which is connected to the anode of the energy storage battery 2, and a cathode of which is connected to an input end of the load. The circuit where the diode D is located, which connects the energy storage battery 2 with the load, serves as a standby branch for supplying power to the load.

Figure 12:
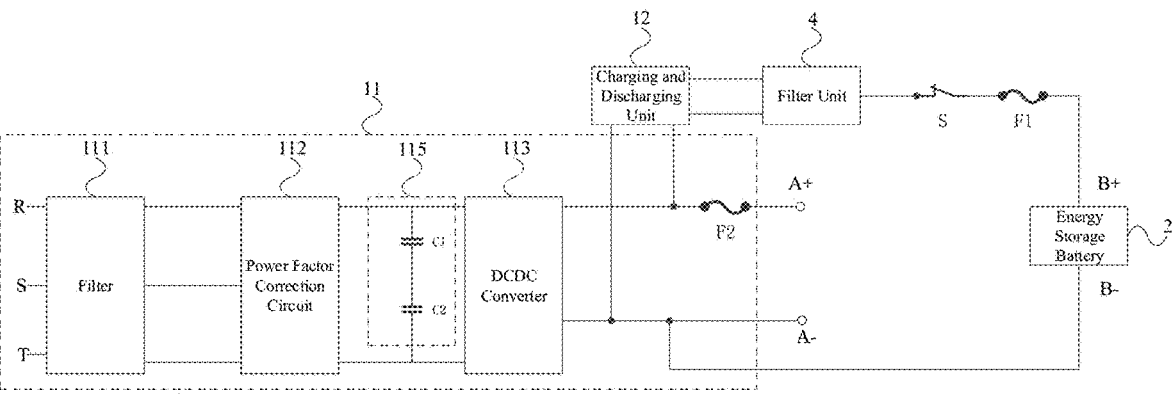
FIG. 12 illustrates a structural diagram of a DC backup power system according to an eleventh embodiment of the present disclosure.

FIG. 12 illustrates a structural diagram of a DC backup power system according to an eleventh embodiment of the present disclosure. As illustrated in FIG. 12, the DC backup power system according to the embodiment of the present disclosure includes a three-port module and an energy storage battery 2, wherein:

the three-port module includes a rectifier unit 11 and a charging and discharging unit 12, wherein the rectifier unit 11 includes a filter 111, a power factor correcting circuit 112 and a DCDC converter 113 which are connected in sequence; an output end of the power factor correction circuit 112 is connected in parallel to an energy storage filter unit 115, which includes capacitors C1 and C2; a first output end A− and a second output end A+ of the DCDC converter 13 are connected to the charging and discharging unit 12, respectively; a filter unit 4, a protection switch S and a fuse F1 are sequentially disposed between the charging and discharging unit 12 and a positive electrode B+ of the energy storage battery 2, the charging and discharging unit 12 is connected to the filter unit 4, a first end of the protection switch S is connected to the filter unit 4, a second end of the protection switch S is connected to a first end of the fuse F1, and a second end of the fuse F1 is connected to the positive electrode B+ of the energy storage battery 2. A negative electrode B− of the energy storage battery 2 is connected to the first output end A− of the DCDC converter. The second output end A+ of the DCDC converter is provided with a fuse F2.

Those skilled in the art should appreciate that the embodiments of the present disclosure may be provided as a method, a system, or a computer program product. Thus the present disclosure may adopt the form of complete hardware embodiment, complete software embodiment, or software and hardware combined embodiment. In addition, the present disclosure may adopt the form of a computer program product which is implementable in one or more computer readable storage mediums (including, but not limited to, magnetic disk memory, CD-ROM, optical memory, etc.) containing computer readable program codes therein.

The present disclosure is described with reference to the flowcharts and/or block diagrams of the method, device (system) and computer program product according to the embodiments of the present disclosure. It should be understood that each flow and/or block in the flowchart and/or block diagram, and the combinations of the flows and/or blocks in the flowchart and/or block diagram can be implemented through computer program instructions. The computer program instructions may be provided to a general computer, a dedicated computer, an embedded processor or a processor of other programmable data processing device, to form a machine so that the instructions, which are executed through the computer or the processor of other programmable data processing device, generate means for realizing the functions specified in one or more flows in the flowchart and one or more blocks in the block diagram.

The computer program instructions may also be stored in a computer readable memory which is capable of guiding the computer or other programmable data processing device to work in a specific mode, so that the instructions stored in the computer readable memory generate a product including instructing means for realizing the functions specified in one or more flows in the flowchart and one or more blocks in the block diagram.

The computer program instructions may also be loaded to the computer or other programmable data processing device, so that a series of operation steps can be performed in the computer or other programmable device to generate a processing realized by the computer, thus the instructions executed in the computer or other programmable device provide the steps for realizing the functions specified in one or more flows in the flowchart and one or more blocks in the block diagram.

In the description of the present disclosure, the description of the reference terms "an embodiment", "a specific embodiment" "some embodiments", "for example", "an example", "a specific example" or "some examples" and the like mean that the specific features, structures, materials, or characteristics described in conjunction with the embodiment(s) or example(s) are comprised in at least one embodiment or example of the present disclosure. In the present disclosure, the schematic expressions of the above terms do not necessarily aim at the same embodiment or example. Moreover, the specific features, structures, materials, or characteristics described may be combined in any one or more embodiments or examples in a suitable manner.

The specific embodiments further make detailed explanations to the objectives, technical solutions and advantageous effects of the present disclosure. It should be understood that those described above are only specific embodiments of the present disclosure and are not intended to limit the protection scope of the present disclosure. Any modification, equivalent substitution or improvement made within the spirit and principle of the present disclosure should fall within the protection scope of the present disclosure.

The invention claimed is:

1. A Direct Current (DC) backup power system, comprising a three-port module and an energy storage battery, wherein:

the three-port module comprises a rectifier unit and a charging and discharging unit, wherein the rectifier unit is connected to the charging and discharging unit, the charging and discharging unit is connected to the energy storage battery, and an output end of the rectifier unit is connected to a load;

the rectifier unit is configured to convert external alternating current into direct current to supply power to the load, charge the energy storage battery through the charging and discharging unit, and output the electric energy of the energy storage battery to supply power to the load after the external alternating current is disconnected;

the rectifier unit comprises a filter, a power factor correction circuit and a DCDC converter which are connected in sequence; a first end of the energy storage battery is connected to a first output end of the DCDC converter, and a second end of the energy storage battery is connected to a second output end of the DCDC converter through the charging and discharging unit.

2. The DC backup power system according to claim 1, wherein the DCDC converter comprises a primary circuit, an isolation transformer and a secondary rectifier circuit; an input end of the isolation transformer is connected to the primary circuit, and an output end of the isolation transformer is connected to the secondary rectifier circuit; and the isolation transformer is configured to isolate the primary circuit and the secondary rectifier circuit, and the secondary rectifier circuit is configured to convert alternating current transferred by the isolation transformer into direct current.

3. The DC backup power system according to claim 2, further comprising a diode, an anode of which is connected to a positive electrode of the energy storage battery, and a cathode of which is connected to an input end of the load.

4. The DC backup power system according to claim 1, wherein a first fault isolation unit is provided between the second end of the energy storage battery and the charging and discharging unit.

5. The DC backup power system according to claim 4, further comprising a diode, an anode of which is connected to a positive electrode of the energy storage battery, and a cathode of which is connected to an input end of the load.

6. The DC backup power system according to claim 4, wherein the first fault isolation unit adopts a fuse.

7. The DC backup power system according to claim 6, further comprising a diode, an anode of which is connected to a positive electrode of the energy storage battery, and a cathode of which is connected to an input end of the load.

8. The DC backup power system according to claim 1, wherein a filter unit and/or an overcurrent protection unit is provided between the second end of the energy storage battery and the charging and discharging unit.

9. The DC backup power system according to claim 8, further comprising a diode, an anode of which is connected to a positive electrode of the energy storage battery, and a cathode of which is connected to an input end of the load.

10. The DC backup power system according to claim 1, wherein the second output end of the DCDC converter is provided with a second fault isolation unit.

11. The DC backup power system according to claim 10, further comprising a diode, an anode of which is connected to a positive electrode of the energy storage battery, and a cathode of which is connected to an input end of the load.

12. The DC backup power system according to claim 10, wherein the second fault isolation unit adopts a fuse or a diode.

13. The DC backup power system according to claim 12, further comprising a diode, an anode of which is connected to a positive electrode of the energy storage battery, and a cathode of which is connected to an input end of the load.

14. The DC backup power system according to claim 1, wherein an energy storage filter unit is connected in parallel at an output end of the power factor correction circuit, and the energy storage filter unit comprises at least one capacitor.

15. The DC backup power system according to claim 14, further comprising a diode, an anode of which is connected to a positive electrode of the energy storage battery, and a cathode of which is connected to an input end of the load.

16. The DC backup power system according to claim 1, further comprising a plurality of three-port modules which are connected in parallel.

17. The DC backup power system according to claim 16, further comprising a diode, an anode of which is connected to a positive electrode of the energy storage battery, and a cathode of which is connected to an input end of the load.

18. The DC backup power system according to claim 1, further comprising a diode, an anode of which is connected to a positive electrode of the energy storage battery, and a cathode of which is connected to an input end of the load.

* * * * *